(12) United States Patent
Tomatsu et al.

(10) Patent No.: US 11,260,634 B2
(45) Date of Patent: Mar. 1, 2022

(54) LAMINATE AND PACKAGING BAG COMPRISING SAME

(71) Applicant: TOYOBO CO., LTD., Osaka (JP)

(72) Inventors: Wakato Tomatsu, Inuyama (JP); Takamichi Goto, Inuyama (JP); Tadashi Nishi, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 17/262,145

(22) PCT Filed: Jul. 10, 2019

(86) PCT No.: PCT/JP2019/027293
§ 371 (c)(1),
(2) Date: Jan. 21, 2021

(87) PCT Pub. No.: WO2020/022060
PCT Pub. Date: Jan. 30, 2020

(65) Prior Publication Data
US 2021/0283889 A1    Sep. 16, 2021

(30) Foreign Application Priority Data
Jul. 27, 2018  (JP) .............................. JP2018-141086

(51) Int. Cl.
| | | |
|---|---|---|
| *B32B 27/08* | (2006.01) | |
| *B32B 1/00* | (2006.01) | |
| *B32B 27/32* | (2006.01) | |
| *B32B 27/36* | (2006.01) | |
| *C08L 53/00* | (2006.01) | |
| *C08L 67/02* | (2006.01) | |

(52) U.S. Cl.
CPC .............. *B32B 27/08* (2013.01); *B32B 1/00* (2013.01); *B32B 27/32* (2013.01); *B32B 27/36* (2013.01); *C08L 53/00* (2013.01); *C08L 67/02* (2013.01); *B32B 2250/02* (2013.01); *B32B 2250/24* (2013.01); *B32B 2307/518* (2013.01); *B32B 2439/46* (2013.01)

(58) Field of Classification Search
CPC ......... B32B 27/08; B32B 27/36; B32B 27/32; B32B 1/00; B32B 2250/24; B32B 2439/46; B32B 2307/518; B32B 2250/02; C08L 53/00; C08L 67/02
See application file for complete search history.

(56) References Cited

U.S. PATENT DOCUMENTS

| | | |
|---|---|---|
| 2010/0055429 A1 | 3/2010 | Lee et al. |
| 2012/0003412 A1 | 1/2012 | Yuno et al. |
| 2012/0094042 A1 | 4/2012 | Lee et al. |
| 2012/0251749 A1 | 10/2012 | Lee et al. |
| 2014/0272348 A1 | 9/2014 | Lee et al. |
| 2015/0028515 A1 | 1/2015 | Lee et al. |
| 2017/0203899 A1* | 7/2017 | Nakajima ............ B65D 33/004 |
| 2020/0156359 A1 | 5/2020 | Goto |

FOREIGN PATENT DOCUMENTS

| | | |
|---|---|---|
| JP | 2012-500307 A | 1/2012 |
| JP | 2014-141302 A | 8/2014 |
| JP | 5790497 B2 | 10/2015 |
| JP | 2018-020844 A | 2/2018 |

OTHER PUBLICATIONS

English machine translation of JP2018-58356, Apr. 12, 2018 (Year: 2018).*
Japanese Patent Office, International Search Report in International Patent Application No. PCT/JP2019/027293 (dated Sep. 3, 2019).

* cited by examiner

*Primary Examiner* — Michael C Miggins
(74) *Attorney, Agent, or Firm* — Leydig, Voit & Mayer, Ltd.

(57) ABSTRACT

The objective of the present invention is to provide a packaging bag which is produced from a laminate, which is excellent in straight cut property and which hardly cause a parting, even if the laminate contains a biaxially stretched PBT film having a large distortedness of a molecular orientation axis. The laminate has a biaxially stretched film substrate consisting of a polyester resin composition and a sealant film consisting of a polyolefin resin composition, and has a straight cut property in a longitudinal direction of 5 mm or less. The polyester resin composition contains 60 wt % or more of a polybutylene telephthalate resin, and the polyolefin resin composition contains 40 wt % to 97 wt % of a propylene-ethylene block copolymer, 3 wt % to 10 wt % of an ethylene-propylene copolymer elastomer, and 0 wt % to 50 wt % of an ethylene-α-olefin random copolymer.

4 Claims, No Drawings

LAMINATE AND PACKAGING BAG COMPRISING SAME

CROSS-REFERENCE TO RELATED APPLICATIONS

This patent application is the U.S. national phase of International Patent Application No. PCT/JP2019/027293, filed Jul. 10, 2019, which claims the benefit of Japanese Patent Application No. 2018-141086, filed Jul. 27, 2018, which are incorporated by reference in their entireties herein.

TECHNICAL FIELD

The present invention relates to a laminate comprising a biaxially stretched film substrate consisting of a polyester resin composition comprising 60 wt % or more of a polybutylene telephthalate resin and a sealant film consisting of a polyolefin resin composition.

BACKGROUND ART

A packaging bag contains a biaxially stretched film or the like as a substrate mainly composed of a polyamide resin, a polyester resin, a polypropylene resin or the like, and is produced by heat-pressing the periphery part of a laminate of the substrate and a sealant film composed of a polyolefin resin composition at a temperature near the melting point of the sealant film while the surfaces of the polyolefin resin films are in contact with each other. Hereinafter, such a heat-press is referred to as heat-seal.

A so-called retort pouch is commonly used as a packaging bag for a food. Such a retort pouch is produced by filling a packaging bag with a food and then sterilizing by steam under pressure at about 130° C., and is suitable for preserving a food for a long time.

In recent years, a demand for a retort pouch has become heavy and a further improvement of properties thereof is simultaneously required due to a social background such as women's social advancement, trend toward a nuclear family and acceleration of demographic aging.

For example, such a retort pouch is recently packed in a box and transported to be sold in many cases. Thus, a retort pouch is required to be hardly broken when dropped during the above processes. In particular, even when a retort pouch is dropped under refrigeration, a retort pouch is required to be hardly broken.

In addition, when a contained food is taken out from a packaging bag, particularly a retort pouch, the packaging bag is often torn at a so-called notch part, which is a precut part formed in a peripheral sealed part of the packaging bag. When a conventional laminate is used, one side of a packaging bag cannot be often torn parallel to one side, generally a horizontal direction, and a packaging bag may be opened on the bias in some cases, or a parting is generated. As a result, a food content becomes difficult to be taken out, or a hand and clothes are dirtied due to a food content. In addition, when a content is heated, the heated content may cause a burn wound. The above "parting" means a phenomenon of separating directions of tearing of laminate at one surface and a reverse surface of a packing bag into up and down.

The reason why a packaging bag is difficult to be torn parallel to one side of the packaging bag is that there is a strain in a substrate of a laminate, in other words, that a molecular orientation axial direction of a biaxially stretched film for the substrate is not parallel to one side of the packaging bag.

If a molecular orientation axial direction of a biaxially stretched film can be parallel to a tearing direction of a packaging bag, such a problem would not arise. Since a molecular orientation axial direction of a produced broad stretched film at a central part in a width direction is parallel to a running direction of the film, a packaging bag can be torn parallel to one side of the packaging bag. On the one hand, at an edge part in a width direction of a film, a tearing direction is inclined, since a molecular orientation axial direction is inclined. It is impractical to obtain a film substrate completely except for an edge part in a width direction, and a degree of a strain has been larger than ever before in association with an increase in speed of a production and a widening of a biaxially stretched film.

Accordingly, such a problem has been tried to be solved by designing a sealant film laminated on a substrate.

Patent document 1 discloses a film produced by uniaxially stretching a polyolefin resin sheet containing an ethylene-propylene block copolymer and an ethylene-propylene random copolymer at a stretching ratio of 3.0 times or less (For example, refer to Patent document 1). It is described that a straight cut property can be improved by laminating this film and a film substrate; however, there is room for improvement on a tear strength and there is a problem that a parting is easily occurred.

Patent document 2 and Patent document 3 disclose a film produced by uniaxially stretching a sheet composed of a polyolefin resin composition containing a propylene-ethylene block copolymer or a propylene-ethylene random copolymer and a propylene-butene elastomer and/or an ethylene-butene elastomer at a stretching ratio of about 5 times; however, there is room for improvement on a breaking of a bag when dropped and there is a problem that a bag breaking resistance is not sufficient at a lower temperature than the operating temperature assumed in Patent document 4.

It has recently attracted attention that a biaxially stretched polyester film mainly composed of a polybutylene terephthalate resin particularly has heat resistance and flexibility as a film substrate for a retort pouch (for example, refer to Patent document 4). If an opening property of a packaging bag produced from such a film having excellent flexibility can be further improved, such a film is expected to be used for packaging a content in a broader range.

RELATED ART DOCUMENT

Patent Document

Patent document 1: JP 5790497 B
Patent document 2: JP 2012-500307 T
Patent document 3: JP 2014-141302 A
Patent document 4: JP 2018-20844 A

DISCLOSURE OF THE INVENTION

Problems to be Solved by the Invention

The objective of the present invention is to provide a laminate comprising biaxially stretched film substrate composed of a polyester resin composition comprising 60 wt % or more of a polybutylene terephthalate resin and a sealant film composed of a polyolefin resin composition, which is used for a packaging bag that is excellent in an opening property and a heat resistance and that is hardly broken when dropped.

Means for Solving the Problems

The inventors of the present invention repeated intensive studies in order to solve the above-described problems. As a result, the inventors completed the present invention by finding that a packaging bag having an excellent opening property and an excellent heat resistance and being hardly broken when dropped can be obtained by improving a straight cut property of a laminate comprising a sealant film comprising an ethylene-propylene copolymer elastomer having a compatibility with a polyolefin resin as a main component and a biaxially stretched film substrate composed of a polyester resin composition having an excellent impact resistance and comprising 60 wt % or more of a polybutylene terephthalate resin.

The embodiments of the present invention are described as follows.

[1] A laminate, comprising a biaxially stretched film substrate consisting of a polyester resin composition and a sealant film consisting of a polyolefin resin composition, wherein the polyester resin composition comprises 60 wt % or more of a polybutylene terephthalate resin, the polyolefin resin composition comprises 40 wt % or more and 97 wt % or less of a propylene-ethylene block copolymer, 3 wt % or more and 10 wt % or less of an ethylene-propylene copolymer elastomer, and 0 wt % or more and 50 wt % or less of an ethylene-αolefin random copolymer, and the laminate has a straight cut property in a longitudinal direction of 5 mm or less.

The longitudinal direction is a stretching direction in the step of stretching an unstretched sheet and is preferably a running direction of a film. A width direction is a direction perpendicular to the longitudinal direction.

[2] The laminate according to [1], wherein the sealant film has a heat shrinkage ratio in a longitudinal direction of 3% or more and 20% or less, the sealant film has a heat shrinkage ratio in a width direction of 1% or less, and the sealant film has a yield stress in a longitudinal direction of 150 MPa or more and 250 MPa or less.

[3] A packaging bag comprising the laminate according to [2].

[4] The packaging bag according to [3], for a retort.

Effects of the Invention

A packaging bag having an excellent opening property and an excellent heat resistance and being hardly broken when dropped can be provided by using the laminate of the present invention.

MODE FOR CARRYING OUT THE INVENTION

Hereinafter, the present invention is specifically described.

Sealant Film

The sealant film of the present invention is composed of a polyolefin resin composition comprising a propylene ethylene block copolymer and an ethylene-propylene copolymer elastomer, or a polyolefin resin composition comprising a propylene-ethylene block copolymer and a propylene-αolefin random copolymer and an ethylene-propylene copolymer elastomer. The sealant film has a sea-island structure and thus has an excellent bag-breaking resistance.

In such a sea-island structure, the main component of the sea part is propylene of the propylene-ethylene block copolymer, the sea part may further contain the propylene-αolefin random copolymer, and the main component of the island part is ethylene of the ethylene-propylene copolymer elastomer and the propylene-ethylene block copolymer.

The sealant film of the resent invention is composed of a polyolefin resin composition comprising 40 wt % or more and 97 wt % or less of a propylene-ethylene block copolymer, 3 wt % or more and 10 wt % or less of an ethylene propylene copolymer elastomer, and 0 wt % or more and 50 wt % or less of an ethylene-αolefin random copolymer. The above ranges lead to an excellent bag breaking property after being dropped and an excellent finishing of a produced bag, and also lead to a good tear strength and a good parting.

When a ratio of the propylene-ethylene block copolymer in the sealant film of the present invention is 40 wt % or less, a tear strength or a retort shrinkage ratio hardly become large. The ratio is preferably 50 wt % or more, more preferably 60 wt % or more, even more preferably 75 wt % or more, and particularly preferably 92 wt % or more. The ratio of the propylene-ethylene block copolymer is preferably 85 wt % or less and more preferably 75 wt % or less in terms of a heat-seal start temperature, a piercing strength or a bag breaking resistance when dropped.

When a ratio of the propylene-ethylene block copolymer in the sealant film of the present invention is 3 wt % or more, a bag breaking resistance when dropped hardly become worse and a piercing strength hardly become large. The ratio is preferably 5 wt % or more, more preferably 7 wt % or more, and particularly preferably 9 wt %.

A ratio of the ethylene-propylene copolymer elastomer is preferably 8 wt % or less and more preferably 7 wt % or less in terms of a piercing strength.

When a ratio of the propylene-αolefin random copolymer in the sealant film of the present invention is more than 50 wt %, a bag breaking resistance when dropped may become worse, and a tear strength, a retort shrinkage degree or a parting may become large in some cases. The ratio is preferably 40 wt % or less and more preferably 35 wt % or less. The ratio of the propylene-αolefin random copolymer is preferably 10 wt % or more, more preferably 20 wt % or more and particularly preferably 25 wt % in terms of a heat-seal start temperature or a piercing strength.

Propylene-Ethylene Block Copolymer

A propylene-ethylene block copolymer can be used in the present invention. The propylene-ethylene block copolymer in this disclosure is a multi-stage copolymer obtained by a first polymerization step using a copolymerization component of a large amount of propylene and a small amount of ethylene and a second polymerization step using a copolymerization component of a small amount of propylene and a large amount of ethylene. It is preferred to use a propylene-ethylene block copolymer obtained by a gas phase polymerization described in JP 2000-186159 A. Specifically, the propylene-ethylene block copolymer is exemplified by a block copolymer obtained by polymerizing Component A mainly containing propylene in a substantive absence of an inert solvent in a first step and then polymerizing Component B containing propylene and ethylene having a content of ethylene of 20 wt % or more and 50 wt % or less in a gas phase in a second step, and is not restricted thereto.

A melt flow rate, i.e. MFR, measured at 230° C. under a load of 2.16 kg of the above-described propylene-ethylene block copolymer is not particularly restricted and is preferably 1 g/10 min or more and 10 g/10 min or less and more preferably 2 or more and 7 or less. When the MFR is less than 1 g/10 min, an extrusion using a T die may be difficult due to an excessively high viscosity. On the one hand, when the MFR is more than 10 g/10 min, problems of a high film stickiness and a low impact strength of a film may be developed.

In this disclosure, a part soluble in xylene at 20° C. is referred to as CXS, and a part insoluble in xylene at 20° C. is referred to as CXIS. In the propylene-ethylene block copolymer usable in the present invention, the main component of CXS is a rubber component referred to as Component B, and the main component of CXIS is a polypropylene component referred to as Component A. Each limiting viscosity is referred to as [η]CXS and [η]CXIS. The values of [η]CXS and [η]CXIS are not particularly restricted, and the [η]CXS is preferably 1.8 dl/g or more and 3.8 dl/g or less, and more preferably 2.0 dl/g or more and 3.0 dl/g or less. When the [η]CXS value is more than 3.0 dl/g, a fisheye may be readily generated in a polyolefin resin film. On the one hand, when the [η]CXS value is 1.8 dl/g or less, a heat-seal strength between polyolefin resin films may be remarkably decreased in some cases. The [η]CXIS is preferably 1.0 dl/g or more and 3.0 dl/g or less. When the [η]CXIS value is more than 3.0 dl/g, an extrusion using a T die may be difficult due to an excessively high viscosity in some eases. On the one hand, when the [η]CXIS value is less than 1.0 dl/g, problems of a film stickiness and a low impact strength of a film may be developed in some cases.

The values of the [η]CXS and [η]CXIS are determined by the following measurement method. In 500 mL, of boiling xylene, 5 g of a sample was completely dissolved. Then, a temperature of the mixture was decreased to 20° C., and the mixture was left to stand for 4 hours or more. Next, the mixture was separated into a filtrate and a precipitate by filtration. The limiting viscosities [η] of a component obtained by drying the filtrate, i.e. CXS, and a component obtained by drying the precipitate under reduced pressure at 70° C., i.e. CXIS, were measured using a Ubbelohde viscometer in tetralin at 135° C.

It is known that MFR and a limiting viscosity n of a whole film generally have a correlation. The MFR of a used resin can be approximately determined by η of a film. The η gives an indication of a molecular weight. When the p value is larger, a molecular weight is larger, and when the η value is smaller, a molecular weight is smaller. The MFR gives an indication of a molecular weight. When the MFR value is smaller, a molecular weight is larger, and when the MFR value is larger, a molecular weight is smaller.

A copolymerization ratio of an ethylene component in the propylene-ethylene block copolymer is preferably 1 wt % or more and 15 wt % or less, and preferably 3 wt % or more and 10 wt % or less. A copolymerization ratio of a propylene component in the propylene-ethylene block copolymer is preferably 85% or more and 99% or less, and preferably 90 wt % or more and 97 wt % or less.

Specifically, an example includes a block copolymer polypropylene resin having an ethylene content of 6.5 mass %, a propylene content of 93.5 wt % and a limiting viscosity η of CXS of 2.5 dl/g (WFS5293-22 manufactured by SUMITOMO CHEMICAL, MFR at 230° C. under a load of 2.16 kg=3.0 g/10 min) and a block copolymer polypropylene resin having an ethylene content of 5.7 mass %, a propylene content of 94.3 wt % and a limiting viscosity θ of CXS of 2.3 dl/g (WFS5293-29 manufactured by SUMITOMO CHEMICAL, MFR at 230° C. under a load of 2.16 kg=3.0 g/10 min).

Propylene-αolefin Random Copolymer

In the present invention, a propylene-αolefin random copolymer may be added to reduce a heat-seal temperature of a polyolefin resin film.

An example of the propylene-αolefin random copolymer includes a copolymer of propylene and at least one of α-olefin having the carbon atom number of 2 or more and 20 or less other than propylene. As such an α-olefin monomer having the carbon atom number of 2 or more and 20 or less, ethylene, butene-1, pentene-1, 4-methylpentene-1, hexene-1 and octene-1 can be used, and ethylene is preferably used in terms of a compatibility with the propylene-ethylene block copolymer, though the monomer is not restricted thereto. At least one α-olefin monomer may be used, and two or more α-olefin monomers may be used in combination as needed. A propylene-ethylene random copolymer is particularly preferred.

The lower limit of a melt flow rate, i.e. MFR, of the propylene-αolefin random copolymer at 230° C. under a load of 2.16 kg is not particularly restricted, and is preferably 0.6 g/10 min, more preferably 1.0 g/10 min, and even more preferably 1.2 g/10 min. When MFR is less than the above, the film may become bleached in some cases due to a low compatibility with the propylene-ethylene block copolymer. The upper limit of a melt flow rate of the propylene-αolefin random copolymer is not particularly restricted, and is preferably 8.0 g/10 min, more preferably 7.0 g/10 min, and even more preferably 5.0 g/10 min. An example of the propylene-αolefin random copolymer specifically includes S131 manufactured by SUMITOMO CHEMICAL (density: 890 kg/m$^3$, MFR at 230° C. under a load of 2.16 kg: 1.5 g/10 min, melting point: 132° C.).

The lower limit of the melting point of the propylene-αolefin random copolymer is not particularly restricted, and is preferably 120° C. and more preferably 125° C. When the melting point is lower titan the above, inner surfaces may be fused in a bag during a retort treatment due to an impaired heat resistance in some cases. The upper limit of the melting point of the propylene-αolefin random copolymer is not particularly restricted, and is preferably 145° C. and more preferably 140° C. When the melting point is the above or higher, an effect to lower a heat-seal temperature may be reduced in some cases.

Ethylene-Propylene Copolymer Elastomer

An ethylene propylene copolymer elastomer is used as one component of a raw material for the polyolefin resin film of the present invention in order to improve a bag breaking resistance when dropped of the packaging bag of the present invention.

The ethylene propylene copolymer elastomer means an amorphous or low crystallinity copolymer that is obtained by copolymerizing ethylene and propylene and that has an elastomeric property at near ordinary temperature.

The ethylene propylene copolymer elastomer in the present invention is not particularly restricted, and the ethylene-propylene copolymer elastomer having a melt flow rate, i.e. MFR, at 230° C. under a load of 2.16 kg of 0.2 g/10 min or more and 5 g/10 min or less, a density of 820 kg/m$^3$ or more and 930 kg/m$^3$ or less and a molecular weight distribution, i.e. Mw/Mn, determined by GPC method of 1.3 or more and 6.0 or less is preferably used.

When the melt flow rate, i.e. MFR, at 230° C. under a load of 2.16 kg of the ethylene-propylene copolymer elastomer according to the present invention is less than 0.2 g/10 min, a fisheye may be readily generated due to insufficiently homogeneous kneading. The melt flow rate of more than 5 g/min is not preferred in terms of a bag breaking resistance.

The limiting viscosity [η] of the ethylene propylene copolymer elastomer according to the present invention is preferably 1.0 or more and 5.0 or less and preferably 1.2 or more and 3.0 or less in terms of a maintenance of a heat-seal strength, an impact strength and a bag strength when dropped. When the limiting viscosity [η] is less than 1.0, a fisheye may be readily generated due to insufficiently homogeneous kneading. The limiting viscosity of more than 5.0 is not preferred in terms of a bag breaking resistance and a heat-seal strength.

A copolymerization ratio of a propylene component in the ethylene-propylene copolymer elastomer of the present invention is preferably 15 wt % or more and 45 wt % or less, and preferably 20 wt % or more and 40 wt % or less. A copolymerization ratio of an ethylene component in the ethylene propylene copolymer elastomer is preferably 55 wt % or more and 85 wt % or less, and preferably 60 wt % or more and 80 wt % or less.

The ethylene-propylene copolymer elastomer is specifically exemplified by an ethylene-propylene copolymer elastomer (TAFMER P0480 manufactured by Mitsui Chemicals) having a density of 870 kg/m$^3$, a MFR at 230° C. under 2.16 kg of 1.8 g/10 min and a content of propylene of 93.5 mass %.

Additive

The sealant film of the present invention may contain an anti-blocking agent. Such an anti-blocking agent to be added is not particularly restricted, and is exemplified by inorganic particles of calcium carbonate, silicon dioxide, titanium dioxide, barium sulfate, magnesium oxide, talc and zeolite, and organic particles of polymers of acrylate, styrene, styrene-butadiene and cross-linked polymers thereof. An organic particle of a cross-linked polymer is preferred in terms of an easy control of a particle size distribution, a dispersibility, an easy maintenance of an optical appearance, and further a falling off prevention of the particle from a film. As the cross-linked polymer, a cross-linked acrylate polymer of an acrylate monomer such as acrylic acid, methacrylic acid, an acrylate ester and a methacrylate ester is preferred, and cross-linked poly(methyl methacrylate) is more preferably recommended. The surface of the particle may be variously coated for a dispersibility and to prevent a falling off. A figure of the particle may be indefinite, spherical, ellipsoidal, rod-like, hornlike, polyhedral, conical, and porous having a hollow on the surface or internally.

An average particle diameter of the anti-blocking agent is preferably 3 μm or more and 12 μm or less in terms of an appearance of the film and an anti-blocking property. Even one kind of an anti-blocking agent is effective, but when two or more kinds of anti-blocking agents having different particle diameters and figures are added, complicated projections are formed on the film surface so that a higher anti-blocking effect may be exerted in some cases. When a block copolymer is used as a main constituent resin, an asperity may be formed on the surface by a dispersion of the polymer and a high anti-blocking effect may be exerted without adding an anti-blocking agent in some cases.

An organic lubricant may be added to the sealant film of the present invention so that a sliding property and an anti-blocking effect of the laminate film are improved and handleability of the film is improved. The reason may be that a lubricating effect and a mold releasing effect are improved by bleeding out an organic lubricant to the film surface. An organic lubricant having a melting point of an ordinary temperature or higher is preferably added. An example of a preferred organic lubricant includes a fatty acid amide and a fatty acid ester, and more specifically includes oleic amide, erucamide, behenamide, ethylenebisoleamide, hexamethylenebisoleamide and ethylenebisoleamide. One organic lubricant may be used by itself, but when two or more organic lubricants may be preferably used in combination, a lubricating effect and an anti-blocking effect may be maintained in a harsher environment.

An appropriate amount of an antioxidant, an antistatic agent, an antifog additive, a neutralizer, a nucleating agent, a colorant, other additives and an inorganic filler may be added in the sealant film of the present invention as needed as long as the objective of the present invention is not impaired. For example, as an antioxidant, a phenol antioxidant and a phosphite antioxidant may be used by itself or in combination, or an antioxidant having a phenol structure and a phosphite structure in one molecule may be used by itself. A content, of an antioxidant, an antistatic agent, an antifog additive, a neutralizer, a nucleating agent, a colorant, other additives and an inorganic filler in the polyolefin resin composition is preferably 0 wt % or more and 3 wt % or less, more preferably 0 wt % or more and 1 wt % or less, even more preferably 0 wt % or more and 0.5 wt % or less, and particularly preferably 0 wt % or more and 2 wt % or less.

Sealant Film Composed of Multiple Layers

The sealant film of the present invention may be composed of a single layer or multiple layers. For example, when the sealant film is composed of three layers of a seal layer, an intermediate layer and a laminate layer, a cost can be reduced without impairing a heat-seal energy and a bag breaking resistance by adding a pellet obtained by recycling the film into the intermediate layer, or a decrease of an impact resistance can be prevented by adding the propylene-αolefin random copolymer into only the seal layer and using mainly the propylene-ethylene block copolymer for the intermediate layer and the laminate layer. When the sealant film is composed of multiple layers, each layer preferably has the composition ratio described in the above-described [1].

Production Method of Sealant Film

As a method for forming the sealant film of the present invention, for example, an inflation method and a T die method can be used, and a T die method is preferred in terms of a high transparency and an easy drafting. The T die method is advantageous for an increase of a cooling rate of an unstretched sheet, since air is a cooling medium in the inflation method but a cooling roll is used in the T die method. A high transparency can be achieved and a load on a latter stretching step can be advantageously controlled by increasing a cooling rate, since crystallization of an unstretched sheet can be prevented. The sealant film is preferably formed by the T die method for the above-described reasons.

The lower limit of a temperature of a cooling roll on which a melted raw material is cast to obtain a non-oriented sheet is not particularly restricted, and is preferably 15° C. and more preferably 20° C. When the temperature is lower than the above, the thickness may not be stabilized because of an insufficient adhesion between an unstretched sheet and a cooling roll due to a condensation of moisture on the cooling roll. The upper limit of the cooling roll temperature is not particularly restricted, and is preferably 50° C. and more preferably 40° C. When the temperature is higher than the above, a transparency of the sealant film may be worsened in some cases.

A method for stretching a non-oriented sheet is not particularly restricted, and for example, an inflation method and a roll stretching method can be used and the roll stretching method is preferred in terms of an easy control of an orientation.

A straight cut property can be obtained by stretching a non-oriented sheet in a longitudinal direction under an appropriate condition. This is because a molecular chain is regularly arranged along a stretching direction. In this disclosure, the direction along which a film is brought in the production step of a film is referred to as a longitudinal direction, and an orthogonal direction to the longitudinal direction is referred to as a width direction.

The lower limit of a stretching ratio in a longitudinal direction is not restricted and is preferably 3.3 times. When the stretching ratio is less than 3.3 times, a tearing strength in a longitudinal direction may become large and a straight cut property may be deteriorated in some cases by decreasing a yield stress. The lower limit is more preferably 3.5 times and even more preferably 3.8 times.

The upper limit of a stretching ratio in a longitudinal direction is not restricted and is preferably 5.5 times. When the stretching ratio is more than 5.5 times, a bag breaking resistance when dropped may be worsened in some cases due to an excessive development of an orientation and a decrease of a seal energy. The upper limit is more preferably 5.0 times.

The lower limit of a roll temperature during stretching in a longitudinal direction is not particularly restricted and is preferably 80° C. When the roll temperature is lower than the above, a stretch stress on the film may be increased and thus the thickness of the film may be changed in some cases. The lower limit is more preferably 90° C.

The upper limit of the stretching roll temperature is not particularly restricted and is preferably 140° C. When the roll temperature is higher than the above, a stretch stress on the film may be decreased and thus not only a tearing strength of the film may be decreased but also the film may be fused on the stretching roll and the production may become difficult in some cases. The upper limit is more preferably 130° C., even more preferably 125° C., and particularly preferably 115° C.

Before an unstretched sheet is subjected to a stretching step, a temperature of the sheet is preferably increased by contacting the sheet with a preheating roll.

The lower limit of a preheating roll for stretching a non-oriented sheet is not particularly restricted, and is preferably 80° C. and more preferably 90° C. When the temperature is lower than the above, a stretching stress may be increased and the thickness may be changed in some cases. The upper limit of the preheating roll temperature is not particularly restricted, and is preferably 140° C., more preferably 130° C., and even mom preferably 125° C. When the temperature is 140° C. or lower, a heat shrinkage ratio and a retort shrinkage degree are hardly increased, since a residual stress after stretching can be decreased by preventing a crystallization by heat before stretching.

The sealant film after the stretching step is preferably subjected to a treatment to accelerate a crystallization in order to inhibit a thermal shrinkage. Hereinafter, the treatment is referred to as an annealing treatment. An example of an annealing treatment method includes a roll heating method and a tenter method, and the roll heating method is preferred in terms of a simple facilities and an easy maintenance. A heat shrinkage can be prevented and further an easily tearable property can be improved by decreasing an internal stress of the film with an annealing treatment. A stretching ratio conventionally has been needed to be large in order to improve an easily tearable property; on the one hand, since an easily tearable property can be improved by the annealing treatment, a retort shrinkage degree and a heat-seal strength after a retort treatment are not needed to be victimized.

The lower limit of an annealing treatment temperature is not particularly restricted, and is preferably 80° C. When the temperature is lower than the above, an appearance of a packaging bag after bag making or retort treatment may become worse and a tearing strength may become large due to a high heat shrinkage ratio. The lower limit is more preferably 100° C. and particularly preferably 110° C.

The upper limit of an annealing treatment temperature is not particularly restricted, and is preferably 140° C. With a higher annealing treatment temperature, a heat shrinkage can be decreased more readily, however, when the annealing treatment temperature is higher than the above, the film thickness may become uneven and the film may be fused on production equipment. The upper limit is more preferably 135° C. and particularly preferably 130° C.

The laminate surface of the above-described sealant film is preferably activated by a corona treatment or the like in the present invention. A laminate strength with a film substrate can be improved by such a procedure.

Property of Sealant Film

Film Thickness

The thickness of the sealant film according to the present invention is not particularly restricted, and the lower limit thereof is preferably 10 μm, more preferably 30 μm, even more preferably 40 μm, and particularly preferably 50 μm. When the thickness is less than the above, the straight cut property of the laminate may become worse, the film may become unworkable due to a poor elasticity, and a bag breaking resistance may become worse due to a lower impact resistance in some cases, since the thickness of the sealant film is relatively thin in comparison with the film substrate. The upper limit of the film thickness is preferably 200 μm, more preferably 130 μm, preferably 100 μm, and particularly preferably 80 μm. When the thickness is more than the above, the film may become unworkable due to an excessive strong elasticity and it may become difficult to produce a desired packaging bag in some cases.

Heat Shrinkage Ratio

The upper limit of a heat shrinkage ratio of the sealant film according to the present invention at 120° C. in a longitudinal direction is preferably 20%. When the ratio is more than the above, a tearing strength may become large and a retort shrinkage of a packaging bag or at the time of heat-seal with the film substrate to be a laminate may become large and as a result, an appearance of a packaging bag may be impaired in some cases. The upper limit is more preferably 17% and even more preferably 14%.

The lower limit of a heat shrinkage ratio of the sealant film according to the present invention in a longitudinal direction is preferably 2%. When the ratio is tried to be smaller than the above, a bag breaking resistance and an appearance may remarkably become worse in some cases, since an annealing temperature and an annealing time are needed to be remarkably large.

The upper limit of a heat shrinkage ratio of the sealant film according to the present invention in a width direction is preferably 1%. When the ratio is more than the above, a tearing strength in a longitudinal direction may become large or a straight cut property may become worse. The upper limit is more preferably 0.5%. The lower limit of a heat shrinkage ratio of the sealant film according to the present invention in a width direction is preferably −3%. When the ratio is Jess than the above, the film may become extended during heat-seal and thus an appearance of a packaging bag may become worse in some cases. The lower limit is preferably −2%.

Yield Stress

A yield stress of the sealant film according to the present invention in a longitudinal direction is preferably 150 MPa or more. When the yield stress is less than the above, a straight cut property in the direction may become worse. The yield stress is more preferably 160 MPa or more and even more preferably 170 MPa or more.

A yield stress of the sealant film according to the present invention in a longitudinal direction is preferably 250 MPa or less. When the yield stress is more than the above, a bag breaking resistance of a packaging bag may become worse in some cases due to a decrease of a seal energy of the laminate of the film and the film substrate.

A ratio of yield stresses of the sealant film according to the present invention in a longitudinal direction and a width direction is not particularly restricted, and is preferably 4.0 or more and more preferably 6.0 or more. When a ratio of yield stresses in a longitudinal direction and a width direction is 4.0 or more, an orientation in the longitudinal direction is not insufficient and thus a straight cut property can be readily improved.

A ratio of yield stresses in a longitudinal direction and a width direction is not particularly restricted, and is preferably 14.0 or less and more preferably 12.0 or less. When the ratio of yield stresses in a longitudinal direction and a width direction is 14.0 or less, a bag breaking resistance may be readily improved, since an orientation in the longitudinal direction may not be excessive and thus a desired heat-seal strength may be obtained.

Tearing Strength

The upper limit of a tearing strength of the sealant film according to the present invention in the longitudinal direction is not particularly restricted, and is preferably 0.2 N. When the tearing strength is more than the above, the laminate may become difficult to be torn apart in some cases. The upper limit is more preferably 0.16 N.

The lower limit of a tearing strength of the sealant film according to the present invention in the longitudinal direction is not particularly restricted, and is preferably 0.02 N. When the tearing strength is less than the above, a bag breaking resistance may become worse in some cases. The lower limit is more preferably 0.03 N.

Wet tension

The lower limit of a wet tension of a surface of the sealant film according to the present invention which surface is laminated with the biaxially stretched film substrate consisting of a polyester resin composition comprising 60 wt % or more of the polybutylene terephthalate resin is not particularly restricted, and is preferably 30 mN/m and more preferably 35 mN/m. When the wet tension is less than the above, a laminate strength may be decreased in some cases. The upper limit of the wet tension is not particularly restricted, and is preferably 55 mN/m and more preferably 50 mN/m. When the wet tension is more than the above, a blocking of a roll for the sealant film may be generated in some cases.

Piercing Strength

The lower limit of a piercing strength of the sealant film according to the present invention is not particularly restricted, and is preferably 7.8 N and more preferably 9 N. When the piercing strength is less than the above and a projection is contacted with a packaging bag, a pinhole is generated. The upper limit of the piercing strength is not particularly restricted, and is preferably 24 N and more preferably 19 N. When the piercing strength is more than the above, the film or the laminate may be difficult to be handled in some cases due to an excessive strong elasticity.

Biaxially stretched film consisting of polyester resin composition comprising 60 wt % or more of polybutylene terephthalate (hereinafter, referred to as PBT) resin The biaxially stretched film consisting of a polyester resin composition comprising 60 wt % or more of PBT resin comprises 60 mass % or more of PBT resin.

When a content amount of PBT resin is less than 60 mass %, excellent features of the biaxially stretched PBT film, such as dimension stability, workability, bag breaking resistance, chemical resistance and pinhole resistance, may be deteriorated.

The biaxially stretched PBT film usable in the present invention may contain other resin and an additive as long as an amount of PBT resin is not less than 60 mass.

A ratio of terephthalic acid as a dicarboxylate component in the PBT resin of the present invention is preferably 90 mol % or more, more preferably 95 mol % or more, even more preferably 98 mol % or more, and particularly preferably 100 mol %. A ratio of 1,4-butanediol as a glycol component is preferably 90 mol % or more, more preferably 95 mol % or more, and even more preferably 97 mol % or more.

The PBT resin of the present invention may be obtained by copolymerization in the above-described range. The biaxially stretched PBT film of the present invention is needed to contain 60 mass % or more of a PBT repeating unit.

An example of a component to be copolymerized to be the PBT resin includes a dicarboxylic acid such as isophthalic acid, o-phthalic acid, naphthalenedicarboxylic acid, biphenyldicarboxylic acid, cyclohexanedicarboxylic acid, adipic acid, azelaic acid and sebacic acid: and a diol component such as ethylene glycol, 1,3-propylene glycol, 1,2-propylene glycol, neopentyl glycol, 1,5-pentanediol, 1,6-hexanediol, diethylene glycol, cyclohexanediol, polyethylene glycol, polytetramethylene glycol and polycarbonatediol.

The biaxially stretched PBT film layer usable in the present invention can contain a polyester resin other than the PBT resin in order to control a film-forming property at the time of a biaxial stretching and mechanical characteristics of the film.

An example of a polyester resin other than the PBT resin includes polyethylene terephthalate (hereinafter, referred to as PET) resin and a polyethylene naphthalate (hereinafter, referred to as PEN) resin.

A polyester resin other than the PBT resin may be copolymerized. An example of a component to be copolymerized with the PET resin includes a dicarboxylic acid such as isophthalic acid, o-phthalic acid, naphthalenedicarboxylic acid, biphenyldicarboxylic acid, cyclohexanedicarboxylic acid, adipic acid, azelaic acid and sebacic acid; and a diol component such as butylene glycol, 1,3-propylene glycol, 1,2-propylene glycol, neopentyl glycol, 1,5-pentanediol, 1,6-hexanediol, diethylene glycol, cyclohexanediol, polyethylene glycol, polytetramethylene glycol and polycarbonatediol.

The lower limit of an intrinsic viscosity of the PBT resin usable in the present invention is preferably 0.9 dl/g, more preferably 0.95 dl/g, and even more preferably 1.0 dl/g.

When the intrinsic viscosity of the PBT resin is less than 0.9 dl/g, an intrinsic viscosity of the produced film, a piercing strength, an impact strength and a bag breaking resistance may be deteriorated in some cases.

The upper limit of an intrinsic viscosity of the PBT resin is preferably 1.3 dl/g. When the intrinsic viscosity is more than the above, a stress during the stretching may excessively become high and a film-forming property may become worse in some cases. In addition, since an extrusion temperature is needed to be high due to a high melt viscosity, a degradant during an extrusion may be readily generated in some cases.

When a PET resin is used, the lower limit of an intrinsic viscosity of a polyester resin usable in the present invention other than the PBT resin is preferably 0.5 dl/g and more preferably 0.6 dl/g.

When the intrinsic viscosity of a polyester resin other than the PBT resin is less than 0.9 dl/g, an intrinsic viscosity of the produced film may be decreased, and a piercing strength, an impact strength and a bag breaking resistance may be deteriorated in some cases.

When a PET resin is used, the upper limit of an intrinsic viscosity of a polyester resin usable in the present invention other than the PBT resin is preferably 1.2 dl/g. When the intrinsic viscosity is more than the above, a film-forming property may be deteriorated in some cases due to an excessively high stress during the stretching. In addition, since an extrusion temperature is needed to be high due to a high melt viscosity, a degradant during an extrusion may be readily generated in some cases.

It is effective to add an antioxidant to the biaxially stretched PBT film layer in order to reduce an eluted substance after a retort treatment of the packaging bag according to the present invention. Thus, a decrease of a molecular weight of a resin during a resin extrusion step is prevented and amounts of 1,4-butanediol and THF remaining in the obtained film are reduced. In addition, an antioxidant is effective on a prevention of a heat decomposition during a retort treatment of the film, since PBT is gradually decomposed by heating.

An example of an antioxidant usable tor the biaxially stretched PBT film layer of the present invention includes a primary antioxidant having functions to capture a phenol-type radical or an amine-type radical and terminate chain and a secondary antioxidant having a function to decompose a phosphorus peroxide, a sulfurous peroxide or the like. Any of the antioxidants may be used. An example of an antioxidant includes a phenol-type antioxidant such as phenol-type, bisphenol-type, thiobisphenol-type and polyphenol-type; an amine-type antioxidant such as diphenylamine-type and quinoline-type; a phosphorus antioxidant such as phosphite-type and phophonite-type; and a sulfurous antioxidant such as thiodipropionate ester-type.

An example of an antioxidant specifically includes n-octadecyl-β-(4'-hydroxy-3,5'-di-t-butylphenyl)propionate, tetrakis[methylene-3-(3',5'-di-t-butyl-4'-hydroxyphenyl)propionate] (commercially available as "Irganox 1010" (trade name)), 1,1,3-tris(2-methyl-4-hydroxy-5-t-butylphenyl)butane, 1,3,5-tris(3,5-di-t-butyl-4-hydroxybenzyl)-S-triazine-2,4,6(1H,3H,5H)-trione, 1,3,5-trimethyl-2,4,6-tris(3,5-di-t-butyl-4-hydroxybenzyl)benzene (commercially available as "Irganox 1330" (trade name)), tris(mixed mono- and/or dinonylphenyl)phosphite, cyclicneopentanetetraylbis(octadecylphosphite), tris(2,4-di-t-butylphenylphosphite), 2,2-methylenebis(4,6-di-t-butylphenyl)octylphosphite, di-lauryl-thiodipropionate, di-myristyl-thiodipropionate and di-stearyl-thiodipropionate. One of the antioxidant may be used, or two or more of the antioxidants may be used in combination. Among the above examples, n-octadecyl-β-(4'-hydroxy(3',5'-di-t-butyl-4'-hydroxyphenyl)propionate] (Irganox 1010) is preferred in terms of an easily availability and food sanitation.

The upper limit of a concentration of an antioxidant is preferably 2000 ppm and more preferably 1000 ppm. When the concentration is more than the above, the antioxidant itself may become an eluted substance in some cases.

The biaxially stretched PBT film layer of the present invention may contain a conventionally known additive such as a lubricant, a stabilizer, a colorant, an antistatic agent and an ultraviolet absorber as needed.

An example of a lubricant includes an inorganic particle lubricant, such as silica, calcium carbonate and alumina, and an organic lubricant. Silica and calcium carbonate are preferred, and porous silica is particularly preferred in terms of a decrease of haze. Transparency and a sliding performance are obtained by a lubricant.

The lower limit of a lubricant concentration is preferably 100 ppm, more preferably 500 ppm, and even more preferably 800 ppm. When the concentration is less than the above, a sliding performance may be deteriorated in some cases. The upper limit of a lubricant concentration is preferably 20000 ppm, more preferably 10000 ppm, and even more preferably 1800 ppm. When the concentration is more than the above, transparency may become worse in some cases.

A method for producing the biaxially stretched PBT film layer of the present invention is specifically described, and the present invention is not restricted thereto.

The lower limit of a resin melting temperature is preferably 200° C., more preferably 250° C., and even more preferably 260° C. When the temperature is lower than the above, extrusion may become instable in some cases. The upper limit of a resin melting temperature is preferably 280° C. and more preferably 270° C.

Since PBT has a rapid crystalizing rate, crystallization is advanced during casting. When PBT is cast to be a single layer, not multiple layers, the crystals grow to large size spherocrystals, since there is not a barrier to inhibit the growth of the crystals. As a result, not only the obtained unstretched sheet becomes susceptible to a fracture during a biaxial stretching by increasing a yield stress of the sheet but also a pinhole resistance and a bag breaking resistance of the obtained biaxially stretched film become insufficient due to an impaired elasticity of the film.

A general multi-layering apparatus such as a multi-layer feed block, a static mixer and a multi-layer multi-manifold can be used for a specific method for a multi-layering. For example, a method for laminating thermoplastic resins sent from different flow channels of two or more extruders to be multi layers using a feed block, a static mixer, a multi-layer multi-manifold or the like. When the same composition is multi-layered in the present invention, the objective of the present invention can be also solved by using only one extruder and setting the above-described multi-layering apparatus in a melt line from an extruder to a die.

The lower limit of a cooling roll temperature is preferably −10° C. When the temperature is lower than the above, the effect to prevent crystallization may become saturated in some cases. The upper limit of a cooling roll temperature is preferably 40° C. When the temperature is higher than the above, stretching may become difficult due to an excessively high crystallization degree. When a cooling roll temperature is adjusted to the above range, an environmental humidity around the cooling roll is preferably reduced to inhibit dew condensation.

A temperature of a cooling roll surface is increased during casting, since a high temperature resin is contacted with the surface. A cooling roll is generally cooled by flowing cooling water in an inner pipe. A temperature difference should be reduced on a cooling roll surface in a width direction by ensuring a sufficient amount of cooling water, devising an arrangement of the pipe, maintaining the pipe to inhibit an adhesion of sledge or the like. A thickness of an unstretched sheet is preferably 15 µm or more and 2500 µm or less.

The above-described casting for a multi-layer is carried out for at least 60 layers or more, preferably 250 layers or more, and even more preferably 1000 layers or more. When the number of the layers is small, the effect to improve a stretching property may become reduced.

Then, a stretching method is described. A stretching method may be any one of a simultaneous biaxial stretching and a sequential biaxial stretching. In order to improve a piercing strength, a plane orientation coefficient is needed to be increased and a sequential biaxial stretching is the most preferred in terms of a rapid membrane production rate and a high productivity.

The lower limit of a stretching temperature in a longitudinal direction is preferably 55° C. and more preferably 60° C. When the temperature is lower than 55° C. a fracture may readily occur. In addition, a distortedness of a molecular orientation in a width direction may become large by increasing a contraction stress during a thermal fixing treatment due to a stronger distortion of a molecular orientation in a longitudinal direction by stretching under a low temperature. As a result, a straight tearing property in a longitudinal direction may be deteriorated in some cases. The upper limit of a stretching temperature in a longitudinal direction is preferably 100° C. and more preferably 95° C. When the temperature is higher than 100° C., a mechanical property may be deteriorated because of a lack of an orientation in some cases.

The lower limit of a stretching ratio in a longitudinal direction is preferably 2.6 times and particularly preferably 2.8 times. When the ratio is less than the above, a mechanical property and a thickness uniformity may be deteriorated because of a lack of an orientation in some cases. The upper limit of a stretching ratio in a longitudinal direction is preferably 4.3 times, more preferably 4.0 times, and particularly preferably 3.8 times. When the ratio is more than the above, the effect to improve a mechanical property and a thickness uniformity may be saturated in some cases. In addition, a distortedness of a molecular orientation in a width direction may become large by increasing a contraction stress during a thermal fixing treatment due to a stronger distortion of a molecular orientation in a longitudinal direction. As a result, a straight tearing property in a longitudinal direction may be deteriorated in some cases.

The lower limit of a stretching temperature in a width direction is preferably 60° C. When the temperature is lower than the above, a fracture may readily occur in some cases. The upper limit of a stretching temperature in a width direction is preferably 100° C. When the temperature is higher than the above, a mechanical property may be deteriorated because of a lack of an orientation in some cases.

The lower limit of a stretching ratio in a width direction is preferably 3.5 times, more preferably 3.6 times, and particularly preferably 3.7 times. When the ratio is less than the above, a mechanical property and a thickness uniformity may be deteriorated because of a lack of an orientation in some cases. The upper limit of a stretching ratio in a width direction is preferably 5 times, more preferably 4.5 times, and particularly preferably 4.0 times. When the ratio is more than the above, the effect to improve a mechanical property and a thickness uniformity may be saturated in some cases.

The lower limit of a thermal fixing temperature in a width direction is preferably 190° C. and more preferably 205° C. The temperature is lower than the above, a shearing and a shrinkage during processing may occur in some cases due to a large heat shrinkage ratio. The upper limit of a thermal fixing temperature in a width direction is preferably 240° C. When the temperature is higher than the above, the film may be melted in some cases or even if the film is not melted, the film may be remarkably brittle in some cases.

The lower limit of a relaxing ratio in a width direction is preferably 3%. When the ratio is less than the above, a fracture may readily occur during a thermal fixing. The upper limit of a relaxing ratio is preferably 12%. When the ratio is more than the above, a thickness uniformity may be generated due to a generation of a slack in some cases. In addition, a shrinkage in a longitudinal direction during a thermal fixing may become large. As a result, a straight tearing property may be deteriorated in some cases due to large distortedness of a molecular orientation at the edge.

The lower limit of the thickness of the biaxially stretched PBT film according to the present invention is preferably 8 µm, more preferably 10 µm, and even more preferably 12 µm. When the thickness is less than 8 µm, a strength required for a film may be insufficient in some cases.

The upper limit of the film thickness is preferably 25 µm, more preferably 18 µm, and even more preferably 16 µm. The thickness more than 25 µm is too thick and economically disadvantaged. In addition, a workability and a productivity during a production of a bag may be deteriorated in some cases.

The upper limit of an orientation axis angle of the biaxially stretched PBT film is not particularly restricted, and when the film is torn in a longitudinal direction, a straight cut property can be exhibited. The upper limit is preferably 30°, more preferably 28°, and even more preferably 25°.

The lower limit of an impact strength of the biaxially stretched PBT film is preferably 0.05 J/µm. When the impact strength is lower than the above, a strength of a packaging bag may be insufficient in some cases.

The upper limit of an impact strength of the biaxially stretched PBT film is preferably 0.2 J/µm. When the impact strength is more than the above, an improvement effect may be saturated in some cases.

The upper limit of a haze per the thickness of the biaxially stretched PBT film is preferably 0.66%/µm, more preferably 0.60%/µm, and even more preferably 0.53%/µm.

When the haze is more than the above and printing is given to the biaxially stretched PBT film, an appearance quality of the printed character and graphics may be impaired in some cases.

The lower limit of a heat shrinkage ratio of the biaxially stretched PBT film in a longitudinal direction and a width direction after heating at 150° for 15 minutes is preferably −1.0%. When the ratio is lower than the above, an improvement effect may be saturated and the film may mechanically become brittle.

The upper limit of a heat shrinkage ratio of the biaxially stretched PBT film in a longitudinal direction and a width direction after heating at 150° C. for 15 minutes is preferably 4.0% and more preferably 3.0%. When the ratio is more than the above, a pitch deviation may occur in some cases due to a dimension change during processing such as print. In general, a heat shrinkage ratio of a film can be adjusted by a treatment temperature during a thermal fixing treatment in a width direction and a relax ratio in a width direction.

An excellent gas barrier property can be given to the biaxially stretched PBT film by laminating an inorganic thin layer on at least one surface thereof.

As such an inorganic thin layer to be laminated on the biaxially stretched PBT film, a thin film composed of a metal or an inorganic oxide is preferably used.

A raw material to form an inorganic thin layer is not particularly restricted as long as a thin layer can be produced from the material, and is preferably exemplified by an inorganic oxide such as silicon oxide (silica), aluminum oxide (alumina) and a mixture of silicon oxide and aluminum oxide in terms of a gas barrier property. In particular, a composite oxide of silicon oxide and aluminum oxide is preferred in terms of a compatibility between elasticity and denseness of the thin layer.

With respect to a mixing ratio of silicon oxide and aluminum oxide in the composite oxide as a mass ratio of the metals, Al ratio is preferably 20% or more and 70% or less. When the Al concentration is less than 20%, a water vapor barrier property may be lowered in some cases. On the one hand, when the Al concentration is more than 70%, an inorganic thin layer may become hard and the layer may be broken during a secondary processing such as print and laminate to deteriorate a barrier property. The silicon oxide in this disclosure means various oxides of silicon such as SiO and $SiO_2$ or a mixture thereof, and the aluminum oxide means various oxides of aluminum such as AlO and $Al_2O_3$ or a mixture thereof.

A membrane thickness of an inorganic thin layer is generally 1 nm or more and 800 nm or less, and preferably 5 nm or more and 500 nm or less. When the membrane thickness of the inorganic thin layer is less than 1 nm, a satisfied gas barrier property may be difficult to be obtained. On the one hand, when the thickness is more than 800 nm as too thick, a gas barrier property may not be improved commensurate with the thickness, and disadvantages may be brought in terms of a Ilex resistance and a production cost.

A method for forming an inorganic thin layer is not particularly restricted, and for example, a publically known vapor deposition method such as physical vapor deposition method (PVD method) and chemical vapor deposition method (CVD method), such as vacuum deposition method, sputtering method and ion plating method, may be appropriately used. Hereinafter, a typical method for forming an inorganic thin layer is described with examples of silicon oxide/aluminum oxide thin layer. For example, when vacuum deposition method is used, a mixture of $SiO_2$ and $Al_2O_3$ or a mixture of $SiO_2$ and Al is preferably used as a deposition raw material. A particle is generally used as such a deposition raw material. A size of each particle is preferably a size such that a pressure during the deposition is not changed and is preferably 1 mm or more and 5 mm or less.

Any of methods of resistance heating, high-frequency induction heating, electron beam heating and laser heating can be used for heating. In addition, oxygen, nitrogen, hydrogen, argon, carbon dioxide, water vapor or the like may be introduced as a reaction gas, and a reactive deposition using a means such as ozone addition and ion assist may be used. Furthermore, a Film forming condition can be randomly changed. For example, a laminate film to be subjected to deposition as a deposition object may be biased or a deposition object may be heated or cooled. Such a deposition raw material, a reaction gas, a bias of a deposition object, heating, cooling or the like may be similarly changed, when a sputtering method and a CVD method are used.

An adhesive layer may be formed between the biaxially stretched PBT film layer and the inorganic thin layer in order to ensure a gas barrier property and a laminate strength after a retort treatment.

Such an adhesive layer between the biaxially stretched PBT film layer and the inorganic thin layer is exemplified by a layer composed of a resin such as urethane, polyester, acrylate, titanium, isocyanate, imine and polybutadiene to which a hardener such as epoxy, isocyanate and melamine is added. An example of the solvent includes an aromatic solvent such as benzene and toluene; an alcohol solvent such as methanol and ethanol; a ketone solvent such as acetone and methyl ethyl ketone; an ester solvent such as ethyl acetate and butyl acetate; and a polyol derivative such as ethylene glycol monomethyl ether. A resin composition for an adhesive layer preferably contain a silane coupling agent having at least one of an organic functional group. An example of the organic functional group includes an alkoxy group, an amino group, an epoxy group and an isocyanate group. A laminate strength after a retort treatment can be further improved by adding the silane coupling agent.

As the resin composition for the adhesive layer, a mixture of a resin having an oxazoline, an acrylate resin and a urethane resin is preferably used. An oxazoline has a strong adhesion with an inorganic thin layer, since an oxazoline group has a high affinity for an organic thin layer and can be reacted with a portion of an oxygen deficiency generated during the formation of the inorganic thin layer and a metal hydroxide. In addition, an unreacted oxazoline group in a covering layer can form a cross-linking by reacting with a carboxylate terminal generated by a hydrolysis of the biaxially stretched PBT film and a covering layer.

A method for forming the adhesive layer is not particularly restricted, and for example, a conventionally known method such as a coating method can be used. An example of a preferable coating method includes an off-line coating method and an in-line coating method. For example, with respect to a dry condition and a heat treatment condition during coating in a case of an in-line coating method in a step to produce the biaxially stretched PBT film, a film is preferably sent to a stretching step in a width direction immediately after the coating in order to dry the film in a preheating zone or a stretching zone of the stretching step depending on a coating thickness and an apparatus condition. In such a case, a temperature is generally preferably 50° C. or higher and 250° C. or lower.

Aluminum Foil Layer

As a raw material of an aluminum foil, a general soft aluminum foil can be used, and an aluminum foil containing iron is preferably used in terms of a further pinhole resistance and a spreadability during forming. A content amount of iron in 100 mass % of an aluminum foil is preferably 0.1 mass % or more and 9.0 mass % or less and more preferably 0.5 mass % or more and 2.0 mass % or less. When the content amount of iron is less than the above, a pinhole resistance and a spreadability may not be sufficiently improved. On the one hand, when the content amount is more than the above, an elasticity may be deteriorated. A thickness of an aluminum foil is preferably 5 μm or more and 12 μm or less and more preferably 7 μm or more and 9 μm or less in terms of a barrier property, a pinhole resistance and a workability.

An aluminum foil is preferably pretreated in terms of an adhesion property and a hydrofluoric acid resistance. An example of such a pretreatment includes degreasing, acid washing and alkaline washing. The pretreatment is mainly classified into a wet type and a dry type. An example of the wet type includes an acid washing and an alkaline washing. An example of an acid used in the acid washing includes an inorganic acid such as sulfuric acid, nitric acid, hydrochloric acid and hydrofluoric acid. One of the acids may be used by itself and two or more of the acids may be used in combination. In addition, various metal salts to provide Fe ion, Ce ion or the like may be added as needed in order to improve an etching effect of the aluminum foil. An example of an alkali used in the alkaline washing includes a strong etching type such as sodium hydroxide. A weak alkaline type or an alkali containing a surfactant may be used. The degreasing may be carried out by an immersion and a spraying.

An example of the dry type method includes a method to conduct a degreasing treatment in a step of an annealing treatment of the aluminum foil.

An example of a degreasing treatment includes a frame treatment and a corona treatment other than the above. In addition, an example of the degreasing treatment also includes a degreasing treatment to oxidatively decompose and remove a pollutant by an active oxygen generated by irradiating ultraviolet rays having a specific wavelength.

Adhesive Layer

An adhesive layer between the biaxially stretched PBT film layer and the polyolefin resin film, the biaxially stretched PBT film and the aluminum foil, and the aluminum foil and the polyolefin resin film is exemplified by a layer composed of a resin such as urethane, polyester, acrylate, titanium, isocyanate, imine and polybutadiene to which a hardener such as epoxy, isocyanate and melamine is added. An example of the solvent includes an aromatic solvent such as benzene and toluene; an alcohol solvent such as methanol and ethanol; a ketone solvent such as acetone and methyl ethyl ketone; an ester solvent such as ethyl acetate and butyl acetate; and a polyol derivative such as ethylene glycol monomethyl ether. The adhesive layer is preferably composed of a polyurethane adhesive containing polyester polyol, polyether polyol and acrylic polyol as a main component. A thickness of the adhesive layer 15 is preferably 1 µm or more and 10 µm or less and more preferably 3 µm or more and 7 µm or less.

Constitution and Production Method of Laminate

The laminate comprises the polyolefin resin film as a sealant and at least the biaxially stretched PBT film as a substrate. The film substrate may be coated and subjected to a deposition processing, and the aluminum toil may be further laminated as conventionally technologies in order to give an adhesive property and a barrier property.

An example of the constitution specifically includes biaxially stretched PBT film/aluminum foil/sealant, biaxially stretched PBT film/deposition layer/sealant, biaxially stretched PBT film/easily adhesive coating layer/deposition layer/sealant, and biaxially stretched PBT film/printing layer/sealant.

As a laminating method, a conventionally known method such as a dry laminating method and an extrusion laminating method can be used. The laminate having an excellent straight cut property can be produced by any of the laminating methods.

Tearing Strength

The upper limit of a tearing strength of the laminate according to the present invention in a longitudinal direction is not particularly restricted and is preferably 0.4 N. When the strength is more than the above, the laminate may become difficult to be torn. The upper limit is more preferably 0.35 N, even more preferably 0.3 N, and sufficiently 0.1 N.

Straight Cut Property

The upper limit of a straight cut property of the laminate according to the present invention in a longitudinal direction is preferably 5 mm, more preferably 3 mm, even more preferably 2 mm, and particularly preferably 1 mm. When the property is more than the above, a parting of the packaging bag may be occurred. The upper limit is sufficiently 1 mm.

Retort Shrinkage Degree

The upper limit of a retort shrinkage degree of the laminate according to the present invention is not particularly restricted and may be 10%. When the degree is more than the above, an appearance of the packaging bag after retort treatment may become worse. The upper limit is more preferably 7%. The lower limit of a retort shrinkage degree in a longitudinal direction is not particularly restricted and may be −1%. When the degree is less than the above, a large stretch after retort treatment may cause a breakage of the bag.

Heat-Seal Strength

The lower limit of a heat-seal strength before retort treatment of the laminate according to the present invention is not particularly restricted, and is preferably 30 N/15 mm and more preferably 35 N/15 mm. When the strength is less than the above, a bag breaking resistance may become worse.

It is preferred to maintain a heat-seal strength of 35 N/15 mm or more even after a retort treatment at 121° C. for 30 minutes. The upper limit of a heat-seal strength is not particularly restricted and is preferably 60 N/15 mm. When the strength is more than the above, a cost may become higher, since a thickness of the film is needed to be increased.

Heat-Seal Start Temperature

The lower limit of a heat-seal start temperature before retort treatment of the laminate according to the present invention is not particularly restricted, and is preferably 160° C. and more preferably 170° C. When the temperature is less than the above, a bag breaking resistance may become worse.

Seal Energy

The lower limit of a seal energy of the laminate according to the present invention is not particularly restricted, and is preferably 0.9 J/150 $mm^2$, more preferably 1.0 J/150 $mm^2$ and even more preferably 1.2 J/150 $mm^2$. When the energy is less than the above, a bag breaking resistance may become worse.

Piercing Strength

The lower limit of a piercing strength before retort treatment of the laminate according to the present invention is not particularly restricted, and is preferably 12.0 N and more preferably 15.0 N. When the strength is less than the above and a projection is contacted with the packaging bag, a pinhole may be generated. The upper limit of a piercing strength is not particularly restricted, and is particularly 45.0 N and more preferably 30.0 N. When the strength is more than the above, a handling may become difficult due to a too strong elasticity of the laminate.

Packaging Bag

The laminate formed to pack a circumference of a content such as a food product in order to protect the content from dust and gas in nature is referred to as a packaging bag. Such a packaging bag is produced by cutting the laminate and bonding inner surfaces using a heated heat-seal bar, ultrasonic wave or the like to be pouched. For example, a four-way sealed bag produced by laying two rectangular laminates so that the sealant surfaces are inside and heat-sealing tour sides is widely used. The packaging bag may be a standing pouch, which can stand on one's own by folds on the bottom of the bag, and may have a figure other than a rectangular shape, such as a pillow packaging bag.

A packaging bag which can be tolerant of heat for heat sterilization by hot water having a temperature of 100° C. or higher by boiling point elevation with increased pressure is referred to as a packaging bag for retort. In addition, a film to provide such a packaging bag is referred to as a film for retort.

Parting

The upper limit of a parting of the packaging bag obtained from the laminate of the present invention is not particularly restricted, and is preferably 5 mm, more preferably 4 mm, even more preferably 3 mm and particularly preferably 2 mm. When the parting is more than the above and the packaging bag is torn, a content may be spilt out in some cases. The upper limit is sufficiently 1 mm.

Bag Breaking Resistance

A four-way sealed bag produced from the laminate of the present invention is dropped repeatedly until the back is broken, and the repeated dropping number is measured. The dropping number when a ratio of remaining bag without being broken is 50% is practically preferably 5 times or more and more preferably 10 times or more. The evaluation criteria are described as follows.

Excellent: dropping number at 50% survival rate is 13 times or more

Good: dropping number at 50% survival rate is 10 times or more and 12 times or less Average: dropping number at 50% survival rate is 5 times or more and 9 times or less Bad: dropping number at 50% survival rate is 4 times or less

EXAMPLES

Hereinafter, the present invention is described in detail with Examples and is in no way restricted thereto. Properties of each Example were measured and evaluated by the following methods. In the evaluation, a longitudinal direction during a film production was defined as a longitudinal direction, and a width direction during a film production was defined as a width direction.

A biaxially stretched film was evaluated by the following measurement methods.

(1) Thickness of Biaxially Stretched PBT Film

The thickness was measured using a dial gage with reference to the method of JIS K7130-1999 A.

(2) Meat Shrinkage Ratio of Biaxially Stretched PBT Film

Heat shrinkage ratios in the longitudinal direction and the width direction were measured by a dimensional change test method described in JIS-C-2151-2006.21 except that a test temperature was adjusted to 150° C. and a heating time was adjusted to 15 minutes.

A test piece was used in accordance with the description of 21.1(a).

(3) Impact Strength of Biaxially Stretched PBT Film

A strength of the film to an impact punching under an atmosphere of 23° C. was measured using an impact tester manufactured by Toyo Seiki Seisaku-sho with reference to JIS K7160-1996. An impact sphericity having a diameter of ½ inch was used. The unit is J/μm.

(4) Piercing Strength of Biaxially Stretched PBT Film

A piercing strength was measured with reference to "2. Strength test method" of "Specifications and Standards for Food, Food Additives, etc. III: Apparatus and containers and packaging" (Ministry of Health and Welfare Notification No. 20,1982) in Food Sanitation Act. A strength when a needle having an edge diameter of 0.7 mm was thrust into the film at a piercing rate of 50 mm/min and the needle passed through the film was measured as a piercing strength. The piercing strength was measured at ordinary temperature, i.e. 23° C. The unit is N.

(5) Orientation Axis Angle of Biaxially Stretched PBT Film

An orientation axis angle was measured using a molecule orientation meter MOA-6004 manufactured by Oji Scientific Instruments. A sample having a longitudinal direction length of 120 mm and a width direction length of 100 mm was cut out and set in a measuring equipment to measure an Angle value as an orientation axis angle. The angle in a longitudinal direction was 0°. Three samples were measured and the average value was calculated.

Hereinafter, measurement methods of the sealant film are described.

(1) Resin Density

A density was evaluated with reference to D method (density gradient tube method) of JIS K7112:1999. Three samples were measured and the average value was calculated.

(2) Melt Flow Rate (MFR)

A melt flow rate was measured at 230° C. under a load of 2.16 kg with reference to JIS K-7210-1. Three samples were measured and the average value was calculated.

(3) Piercing Strength

A piercing strength of the sealant film or the laminate was measured at 23° C. with reference to "2. Strength test method" of "Specifications and Standards for Food, Food Additives, etc. III: Apparatus and containers and packaging" (Ministry of Health and Welfare Notification No. 20, 1982) in Food Sanitation Act. A strength when a needle having an edge diameter of 0.7 mm was thrust into the film at a piercing rate of 50 mm/min and the needle passed through the film was measured. A piercing strength per 1 μm of the film [N/μm] was calculated by dividing the measured value by the thickness of the film. Three samples were measured and the average value was calculated.

Also, the laminate was subjected to a retort treatment in hot water at 121° C. for 30 minutes, and then the measurement was performed.

(4) Tearing Strength

A strip sample having a longitudinal direction length of 150 mm and a direction length perpendicular to the longitudinal direction of 60 mm was cut out from the film and the laminate. A notch of 30 mm was made from the central part of one short side of the sample along the longitudinal direction. The condition of the sample was adjusted in an atmosphere of temperature of 23° C. and a relative humidity of 50% to be subjected to the measurement.

The ranges 10 mm away from right and left short sides of the cut sample were respectively gripped by grippers, and the grippers were attached to Auto graph AG-I manufactured by SHIMADZU CORPORATION while the distance between two grippers was adjusted to 40 mm and the grippers were carefully tighten so that the long side of the sample became parallel to a virtual center line between the two grippers.

The test speed was adjusted to 200 mm/min, and the testing machine was started. The tear strength was measured until the cut reached another short side of the sample, and the average value of the tear strengths at the cut points of 25 mm, 50 mm, 75 mm and 100 mm was calculated.

The measurement of the three samples was performed both when the section on the right side was gripped by the upper gripper with placing the inner surface of the wound film forward and when the section on the left side was gripped by the upper gripper, and the average value was respectively calculated. The larger value among the measurement results of the right side and the left side was determined as a piercing strength.

The measurement of the three samples was similarly performed both when the section on the right side was gripped by the upper gripper with placing the polyolefin resin film side of the laminate forward and when the section on the left side was gripped by the upper gripper, and an average value was respectively calculated. The larger value among the measurement results of the right side and the left side was determined as a piercing strength.

(5) Yield Stress

The sealant film was cut to be a rectangle having a longitudinal direction length of 80 mm and a width direction length of 15 mm. A tensile test was conducted using UNIVERSAL TESTING SYSTEM 5965 manufactured by Instron with adjusting a distance between gauge lines to 20 mm at a crosshead speed of 1000 mm/min. A tensile stress at the time a slope of a stress-strain curve initially became 0 was determined as a yield stress. When a stretching ratio is high, a point which has a slope of 0 and which is generally referred to as an upper yield point disappears. Even in such a case, a point at which a slope initially became 0 around a fracture point was determined as a yield stress. The measurement of three samples was performed in a longitudinal direction and a width direction, and each of the average value was calculated. The yield stress in a longitudinal direction was divided by the yield stress in a width direction to calculate a yield stress ratio.

(6) Meat Shrinkage Ratio

The sealant film was cut to be a 120 mm square. Gauge lines were written at 100 mm intervals respectively in a longitudinal direction (the direction along which a film was brought in the production step of a film) and in a width direction (an orthogonal direction to the longitudinal direction). The sample was hanged in an oven to treat at 120° C. for 30 minutes. The distance between the gauge lines was measured, and a heat shrinkage ratio was calculated in accordance with the following formula. The measurement of the three samples was performed, and the average value was calculated.

Heat shrinkage ratio=(length of gauge line before heat treatment−length of gauge line after heat treatment)/length of gauge line before heat treatment×100(%)

Hereinafter, measurement methods for the laminate are described.

(1) Straight Cut Property

A straight cut property means that when the sealant film or the laminate is torn, the sealant film or the laminate is torn straight in a longitudinal direction. The measurement was performed as follows. Since the film was stretched in a longitudinal direction in Examples, the straight cut property was evaluated in a longitudinal direction only.

The laminate was cut to be a rectangle having a longitudinal direction length of 150 mm and a width direction length of 60 mm. The rectangle is cut from the central part of one short side along the longitudinal direction to form 30 mm notch. The measurement was performed after the condition of the sample was controlled in an atmosphere of a temperature of 23° C. and a relative humidity of 50%.

With reference to JIS K7128-1:1998, the ranges 10 mm away from right and left short sides of the cut sample were respectively gripped by grippers, and the grippers were attached to Auto graph AG-I manufactured by SHIMADZU CORPORATION while the distance between the two grippers was adjusted to 40 mm, and the sample was torn.

A distance moved to the width direction from the line connecting the centers of the short sides was measured at the time the sample was torn 120 mm in length in a longitudinal direction not involving the notch of 30 mm, and the absolute value thereof was recorded. The measurement of three samples was performed both when the section on the right side was gripped by the upper gripper with placing the polyolefin resin film side of the laminate toward and when the section on the left side was gripped by the upper gripper, and the average value was respectively calculated. The larger value among the measurement results of the right side and the left side was determined as a straight cut property.

(2) Retort Shrinkage Degree

The laminate was cut to be a 120 mm square. Gauge lines were written at 100 mm intervals respectively in a longitudinal direction and in a width direction. The sample was subjected to a retort treatment using hot water at 121° C. for 30 minutes. The distance between the gauge lines was measured, and a retort shrinkage degree was calculated in accordance with the following formula. The measurement of three samples was performed, and the average value was calculated.

Retort shrinkage degree=(length of gauge line before treatment−length of gauge fine after treatment)/length of gauge line before treatment×100(%)

(3) Heat-Seal Strength

A heat-seal condition and a condition to measure a strength are described as follows. Specifically, the sealant film sides of the laminates obtained in Examples and Comparative examples were superposed, heat-sealed in the condition of a pressure of 0.2 MPa, a seal bar width of 10 mm and a heat-seal temperature of 220° C. for 1 second, and then allowed to be cooled. The film heat-sealed at each temperature was respectively cut to obtain a test sample having a longitudinal direction length of 80 mm and a width direction length of 15 mm, and a peeling strength of each test sample at the time the heat-sealed part of the test sample was peeled in a crosshead speed of 200 mm/min was measured. As a testing machine, UNIVERSAL TESTING SYSTEM 5965 manufactured by Instron was used. The measurement of three samples was respectively performed, and the average value was calculated. The measurement was performed before and after the retort treatment at 121° C. for 30 minutes.

(4) Heat-Seal Start Temperature

A heat-seal start temperature has a correlation with a productivity of a continuous production using a bag-making machine. A good bag-making machine adequacy means that a sufficient sealing performance can be achieved in a temperature range that the biaxially stretched film as a substrate is not shrunk or broken. A heat-seal start temperature was evaluated as follows.

A temperature of a heat-seal bar was changed at 5° C. interval, and a heat-seal strength of three samples was respectively measured. A weighted average was calculated from heat-seal strengths at temperatures immediately before and after a heat-seal strength exceeded 30 N.

(5) Seal Energy

A heat-seal strength was measured before a retort treatment, and a seal energy was calculated by analyzing a graph area from a start of peeling to a breaking in a measurement, curve of which lateral axis was a peeling distance and of which longitudinal axis was a peeling strength using analysis software blue hill3 for Instron. The measurement of three samples was respectively performed, and the average value was calculated.

(6) Parting

The sealant films of two of the laminates were faced with each other and heat-sealed to prepare a four-way sealed bag having an inside dimension of a longitudinal direction length of 120 mm and a width direction length of 170 mm. A notch was formed at the edge of the four-way sealed bag, and the bag was torn in a longitudinal direction with hand. The bag was cut to the opposite edge, and the distance of the tearing lines of the upper side and the under side of the film of the bag was measured. The measurement of three samples was respectively performed in both of a direction in which the right hand side was forward and a direction in which the left hand side was forward, and the average value was calculated.

(7) Bag Breaking Resistance

The laminate was cut to prepare a four-way sealed bag having an inside dimension of a longitudinal direction length of 170 mm and a lateral direction length of 120 mm and containing 300 ml of saturated saline in a heat-seal condition of a pressure of 0.2 MPa, a seal bar width of 10 mm and a heat-seal temperature of 220° C. for 1 second. The edge of the four-sealed bag was cut after a bag-making processing to adjust a seal width to 5 mm. The four-way sealed bag was subjected to a retort treatment at 121° C. for 30 minutes. Then, the bag was left to stand still in an environment of −5° C. for 8 hours and fallen onto a planner concrete floor from a height of 1.0 m in the same environment. Such a dropping was repeated until the bag was broken, and the repeated dropping number was measured with the following criteria. Twenty bags were used per each criterion.

Excellent: dropping number at 50% survival rate is 13 times or more

Good: dropping number at 50% survival rate is 10 times or more and 12 times or less Average: dropping number at 50% survival rate is 5 times or more and 9 times or less Bad: dropping number at 50% survival rate is 4 times or less Example 1

Production of Biaxially Stretched PBT Film

As PBT Resin 1, 1100-211XG (CHANG CHUN PLASTICS CO., L width, intrinsic viscosity: 1.28 dl/g) was used.

A mixture of 80 mass parts of a PBT resin, 20 mass parts of a PET resin and a porous silica particle as an inactive particle in a silica concentration of 1600 ppm was melted using a uniaxial extruder. The PET resin was composed of terephthalic acid//ethylene glycol=100//100 by mol % and has an intrinsic viscosity of 0.62 dl/g. An average particle diameter of the porous silica particle was 2.4 μm. Then, a melt line was installed in a static mixer having 12 elements. Thus, a melt of the PBT resin was divided and laminated to obtain a multi-layer melt composed of the same raw material. The melt was cast from T-dies at 265° C. and adhered on a cooling roll of 15° C. by an electrostatic adhesion method to obtain an unstretched sheet.

Next, the sheet was stretched 3.0 times in a longitudinal direction using rolls at 70° C., and then stretched 4.0 times in a cross direction at 90° C. through a tenter. After the sheet was subjected to a heat treatment under tension at 200° C. for 3 hours and a relaxing treatment by 1% for 1 second, grippers at the both edges were respectively cut by 10% to obtain a biaxially stretched PBT film having a thickness of 15 μm.

Production of Sealant Film

To 94 wt % of a propylene-ethylene block copolymer (WFS5293-22 manufactured by SUMITOMO CHEMICAL, propylene content amount: 93.5 wt %) having a resin density of 891 kg/m$^3$ and MFR at 230° C. under 2.16 kg of 3.0 g/10 min, 6 wt % of an ethylene propylene copolymer elastomer resin (TAFMER P0480 manufactured by Mitsui Chemicals, propylene content amount: 27 wt %) having a resin density of 870 kg/m$^3$ and MFR at 230° C. under 2.16 kg of 1.8 g/10 min was mixed.

Melt Extrusion

The mixed polyolefin resin was supplied to T slot dies using 3-stage single-axis extruder having a screw diameter of 90 mm, and extruded under an exit temperature of the die of 230° C. The die was designed so that a preland had a width of 800 mm and 2 stages, and a figure of a step part was curved in order to equalize a flow of the melted resin in the dies.

Cooling

A melted resin sheet extruded from the dies was cooled on a cooling roll of 21° C. to obtain an unstretched polyolefin resin film having a layer thickness of 270 μm. The both ends of the film was fixed on the cooling roll by air nozzles, the overall width of the melted resin sheet was held down on the cooling roll by an air knife, and concurrently a vacuum chamber was used in order to prevent air from intruding between the melted resin sheet and the cooling roll during the cooling of the cooling roll. The air nozzles were installed in series in the direction of forward movement of the film at the both ends. The dies were surrounded by a sheet in order to prevent wind from blowing against the melted resin sheet.

Preheating

The unstretched sheet was sent to a heated roll group and preheated by contacting the sheet with the roll. The temperature of the preheating roll was 105° C. A plurality of rolls was used, and the both faces of the film was preheated.

Stretching

The unstretched sheet was sent to a roll stretching machine, and the thickness was adjusted to 60 μm by stretching 4.0 times in a longitudinal direction by the difference of the roll speeds. The temperature of the stretching roll was adjusted to 105° C.

Annealing Treatment

The sheet was subjected to a heat treatment at 130° C. using annealing rolls. A plurality of rolls was used, and the both faces of the film were subjected to a heat treatment.

Corona Treatment

One surface (laminate surface) of the film was subjected to a corona treatment.

Take-Up

Take-up was conducted at a film-forming rate of 20 m/min. The crust part of the produced film was cropped, and the film was rolled up in a roll state. The wet tension of the one surface (laminate surface) of the film was 42 mN/m.

Production of Laminate

The obtained biaxially stretched PBT film and the polyolefin resin film as the sealant film were dry-laminated using an ester adhesive. The biaxially stretched PBT had a thickness of 15 μm and an orientation angle of 30° to the longitudinal direction. The ester adhesive was prepared by mixing 33.6 mass parts of an ester adhesive for dry laminate (TM569 manufactured by Toyo-Morton), 4.0 mass parts of a hardener (CAT10L manufactured by Toyo-Morton) and 62.4 mass pars of ethyl acetate. The amount of the applied adhesive was 3.0 g/m². A laminate was obtained by aging the laminated laminate at 40° C. for 3 days.

Example 2

A laminate was obtained by a similar method to Example 1 except that the mixing ratio of propylene-ethylene block copolymer (WFS5293-22 manufactured by SUMITOMO CHEMICAL) and ethylene propylene copolymer elastomer (TAFMERP0480 manufactured by Mitsui Chemicals) was changed to 96 wt % of propylene-ethylene block copolymer and 4 wt % of ethylene-propylene copolymer elastomer (TAFMER P0480 manufactured by Mitsui Chemicals).

Example 3

A laminate was obtained by a similar method to Example 1 except that the mixing ratio of propylene-ethylene block copolymer (WFS5293-22 manufactured by SUMITOMO CHEMICAL) and ethylene-propylene copolymer elastomer was changed to 90 wt % of propylene-ethylene block copolymer and 10 wt % of ethylene propylene copolymer elastomer (TAFMER P0480 manufactured by Mitsui Chemicals).

Example 4

A laminate was obtained by a similar method to Example 1 except that the mixing ratio of the resin was changed to 64 wt % of propylene-ethylene block copolymer, 6 wt % of ethylene-propylene copolymer elastomer (TAFMERP0480 manufactured by Mitsui Chemicals) and 30 wt % of propylene-ethylene random copolymer (S131 manufactured by SUMITOMO CHEMICAL) having a density of 890 kg/m³, a MFR measured at 230° C. under 2.16 kg of 1.5 g/10 min and a melting point of 132° C., and the temperature of the annealing roll was changed to 120° C.

Example 5

A laminate was obtained by a similar method to Example 4 except that the stretching ratio in the longitudinal direction was changed to 4.5 times and the temperature of the annealing roll was changed to 130° C.

Example 6

A laminate was obtained by a similar method to Example 4 except that the temperature of the annealing roll was changed to 130° C.

Example 7

A laminate was obtained by a similar method to Example 6 except that the mixing ratio of the resin was changed to 74 wt % of propylene-ethylene block copolymer (WFS5293-22 manufactured by SUMITOMO CHEMICAL), 6 wt % of ethylene-propylene copolymer elastomer (TAFMERP0480 manufactured by Mitsui Chemicals) and 20 wt % of propylene-ethylene random copolymer (S131 manufactured by SUMITOMO CHEMICAL).

Comparative Example 1

A laminate was obtained by a similar method to Example 2 except that the stretching ratio was changed 1.0 time, in other words, the film was not stretched, by changing the cooling roll speed for casting without changing the stretching roll speed, and the annealing treatment was not conducted.

A parting became large in Comparative example 1 due to a deteriorated straight cut property. The result is shown in Table 1, in which the longitudinal direction is referenced as MD (machine direction), and the width direction is referenced as TD (transverse direction).

| | | | Ex. 1 | Ex. 2 | Ex. 3 | Ex. 4 | Ex. 5 | Ex. 6 | Ex. 7 | Comparative ex. 1 |
|---|---|---|---|---|---|---|---|---|---|---|
| Substrate | PBT | wt % | 80 | 80 | 80 | 80 | 80 | 80 | 80 | 80 |
| | PET | wt % | 20 | 20 | 20 | 20 | 20 | 20 | 20 | 20 |
| | Thickness | μm | 15 | 15 | 15 | 15 | 15 | 15 | 15 | 15 |
| | Heat shrinkage ratio MD | % | 2.5 | 2.5 | 2.5 | 2.5 | 2.5 | 2.5 | 2.5 | 2.5 |
| | Heat shrinkage ratio TD | % | 0.3 | 0.3 | 0.3 | 0.3 | 0.3 | 0.3 | 0.3 | 0.3 |
| | Piercing strength | N | 10.2 | 10.2 | 10.2 | 10.2 | 10.2 | 10.2 | 10.2 | 10.2 |
| Sealant film | Propylene-ethylene block copolymer | | WFS5293-22 | WFS5293-22 | WFS5293-22 | WFS5293-22 | WFS5293-22 | WFS5293-22 | WFS5293-22 | WFS5293-22 |
| | | wt % | 94 | 96 | 90 | 64 | 64 | 64 | 74 | 96 |
| | Ethylene-propylene copolymer elastomer | | P0480 | P0480 | P0480 | P0480 | P0480 | P0480 | P0480 | P0480 |
| | | wt % | 6 | 4 | 10 | 6 | 6 | 6 | 6 | 4 |
| | Ethylene-α olefin random copolymer | | — | — | — | S131 | S131 | S131 | S131 | — |
| | | wt % | — | — | — | 30 | 30 | 30 | 20 | — |
| | Stretching ratio | | — | 4.0 | 4.0 | 4.0 | 4.5 | 4.0 | 4.0 | 1.0 |
| | Annealing treatment temperature | ° C. | 130 | 130 | 130 | 120 | 130 | 130 | 130 | — |
| | Thickness | μm | 60 | 60 | 60 | 60 | 60 | 60 | 60 | 60 |
| | Piercing strength | N | 10.8 | 10.2 | 11.4 | 10.2 | 10.8 | 10.2 | 10.8 | 3.6 |
| | Tearing strength MD | N | 0.10 | 0.09 | 0.15 | 0.21 | 0.15 | 0.14 | 0.16 | 3.20 |
| | Tearing strength TD | N | Unmeasurable* | Unmeasurable* | Unmeasurable* | 3.2 | 3.0 | 3.3 | 2.8 | 7.3 |
| | Yield stress MD | MPa | 170 | 176 | 174 | 171 | 172 | 172 | 174 | 20 |
| | Yield stress TD | MPa | 22 | 21 | 22 | 23 | 22 | 22 | 22 | 17 |

-continued

|  |  |  |  | Ex. 1 | Ex. 2 | Ex. 3 | Ex. 4 | Ex. 5 | Ex. 6 | Ex. 7 | Comparative ex. 1 |
|---|---|---|---|---|---|---|---|---|---|---|---|
|  | Ratio of yield stress | MD/TD | — | 7.7 | 8.4 | 7.9 | 7.4 | 7.8 | 7.8 | 7.9 | 1.2 |
|  | Heat shrinkage ratio | MD | % | 13.8 | 13.5 | 19.0 | 15.0 | 11.3 | 10.3 | 14.5 | 0.2 |
|  | Heat shrinkage ratio | TD | % | 0.5 | 0.3 | 0.1 | 0.1 | 0.2 | 0.2 | 0.2 | 0.6 |
| Laminate | Straight cut property |  | mm | 1 | 1 | 1 | 3 | 2 | 3 | 3 | 30 |
|  | Tearing strength | MD | N | 0.51 | 0.45 | 0.64 | 0.88 | 0.66 | 0.85 | 0.72 | 6.31 |
|  | Tearing strength | TD | N | Unmeasurable* | Unmeasurable* | Unmeasurable* | Unmeasurable* | Unmeasurable* | Unmeasurable* | Unmeasurable* | 8.73 |
|  | Piercing strength | Before retort | N | 17.6 | 17.6 | 17.8 | 17.1 | 18.2 | 17.1 | 17.3 | 10.6 |
|  |  | After retort | N | 18.5 | 18.6 | 19.0 | 18.2 | 19.6 | 18.1 | 18.6 | 11.9 |
|  | Retort shrinkage | MD | % | 1.6 | 1.6 | 1.6 | 2.9 | 2.3 | 2.2 | 1.9 | 1.6 |
|  | Retort shrinkage | TD | % | 0.1 | 0.1 | 0.1 | 0.3 | 0.1 | 0.1 | 0.1 | 0.8 |
|  | Heat-seal strength | Before retort | N/15 mm | 42 | 43 | 39 | 39 | 39 | 39 | 40 | 38 |
|  |  | After retort | N/15 mm | 39 | 40 | 36 | 36 | 36 | 36 | 38 | 36 |
|  | Heat-seal start temperature |  | ° C. | 190 | 191 | 191 | 170 | 178 | 176 | 180 | 166 |
|  | Seal energy |  | J/150 mm$^2$ | 1.4 | 1.4 | 1.2 | 1.3 | 1.2 | 1.2 | 1.3 | 2.0 |
| Packaging bag | Parting |  | mm | 3 | 3 | 3 | 5 | 4 | 5 | 4 | 79 |
|  | Bag breaking resistance |  | Excellent, Good, Average, Bad | Good | Good | Good | Good | Good | Good | Good | Excellent |

The term "Unmeasurable*" as an evaluation result in Table 1 means that the film or the laminate was torn in the longitudinal direction during the property evaluation, and as a result, a measurement value could not be obtained.

INDUSTRIAL APPLICABILITY

The present invention can significantly contribute to the industry, since a retort pouch which can be straightly opened in the opening direction with less parting and which has an excellent flexibility can be provided.

The invention claimed is:

1. A laminate, comprising
a biaxially stretched film substrate consisting of a polyester resin composition, and
a sealant film consisting of a polyolefin resin composition, wherein
the polyester resin composition comprises 60 wt % or more of a polybutylene terephthalate resin,
the polyolefin resin composition comprises 40 wt % or more and 97 wt % or less of a propylene-ethylene block copolymer, 3 wt % or more and 10 wt % or less of an ethylene-propylene copolymer elastomer, and 0 wt % or more and 50 wt % or less of an ethylene-α-olefin random copolymer,
the sealant film is a stretched film,
the sealant film has a ratio of yield stresses in a longitudinal direction to a width direction of 4.0 or more and 14.0 or less, and
the laminate has a straight cut property in a longitudinal direction of 5 mm or less when measured in accordance with JIS K7128-1:1998.

2. The laminate according to claim 1, wherein the sealant film has a heat shrinkage ratio in a longitudinal direction of 3% or more and 20% or less, the sealant film has a heat shrinkage ratio in a width direction of 1% or less, and the sealant film has a yield stress in a longitudinal direction of 150 MPa or more and 250 MPa or less.

3. A packaging bag comprising the laminate according to claim 2.

4. The packaging bag according to claim 3, for a retort.

* * * * *